July 8, 1924.

A. JORDAHL

AIR FILTER

Original Filed Feb. 10, 1923   2 Sheets-Sheet 1

1,500,586

Inventor
Anders Jordahl
C. P. Goepel
Attorney

July 8, 1924.
A. JORDAHL
AIR FILTER
Original Filed Feb. 10, 1923
1,500,586
2 Sheets-Sheet 2
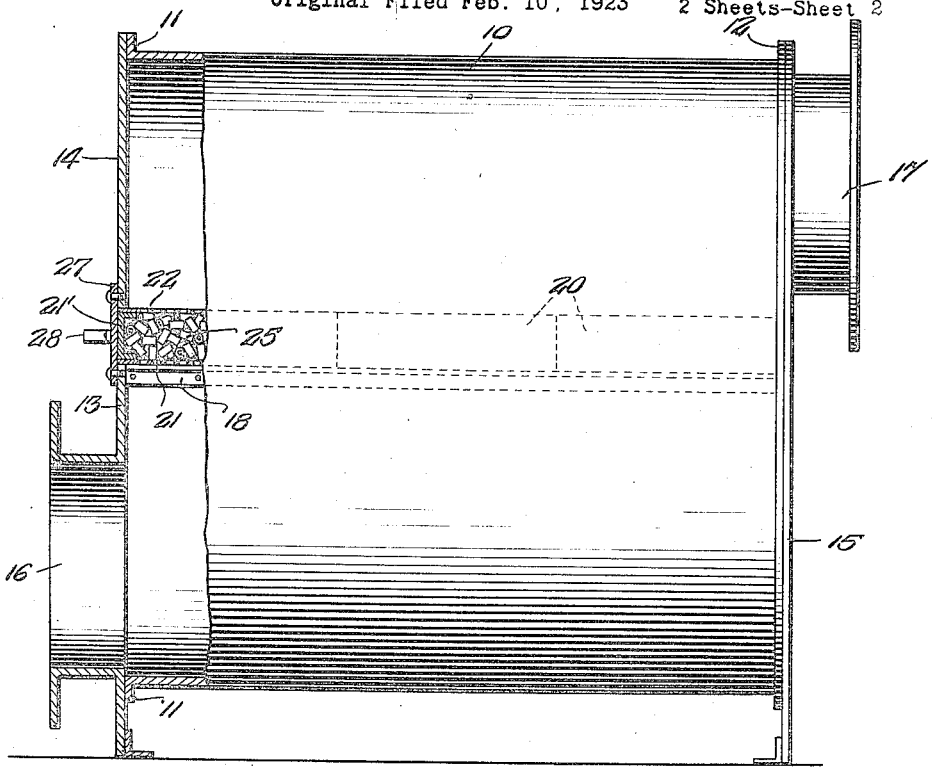

Patented July 8, 1924.

1,500,586

UNITED STATES PATENT OFFICE.

ANDERS JORDAHL, OF NEW YORK, N. Y.

AIR FILTER.

Application filed February 10, 1923, Serial No. 618,203. Renewed January 24, 1924.

*To all whom it may concern:*

Be it known that I, ANDERS JORDAHL, a subject of the King of Norway, residing at New York, in the county and State of New York, have invented certain new and useful Improvements in Air Filters, of which the following is a specification.

This invention relates to air filters adaptable for filtering the air supplied to compressors, turbo-dynamos, drying chambers, and for other purposes, and particularly to a form of air filter in which the air is passed through filtering material coated with viscous matter, and in which the filtering bed comprises a series of units which may be readily dissembled for cleaning the contents thereof.

The invention has for one of its objects to provide a device of the character stated in which a large area of contact with the viscous filtering material is provided for the air within a compact structure.

With the foregoing and other objects in view, hereinafter stated, the invention consists of the construction hereinafter described, and illustrated in the accompanying drawings, which show one embodiment of the invention, but it is to be understood that changes and modifications may be made therein without departing from the principle and mode of operation of the invention.

In the accompanying drawings in which similar reference numerals indicate similar parts throughout the several views;

Fig. 3 represents a side elevation of the device shown in Fig. 1, partly in section;

Fig. 4 represents an enlarged plan of one of the filtering units constituting a part of the filtering bed.

Figure 1:
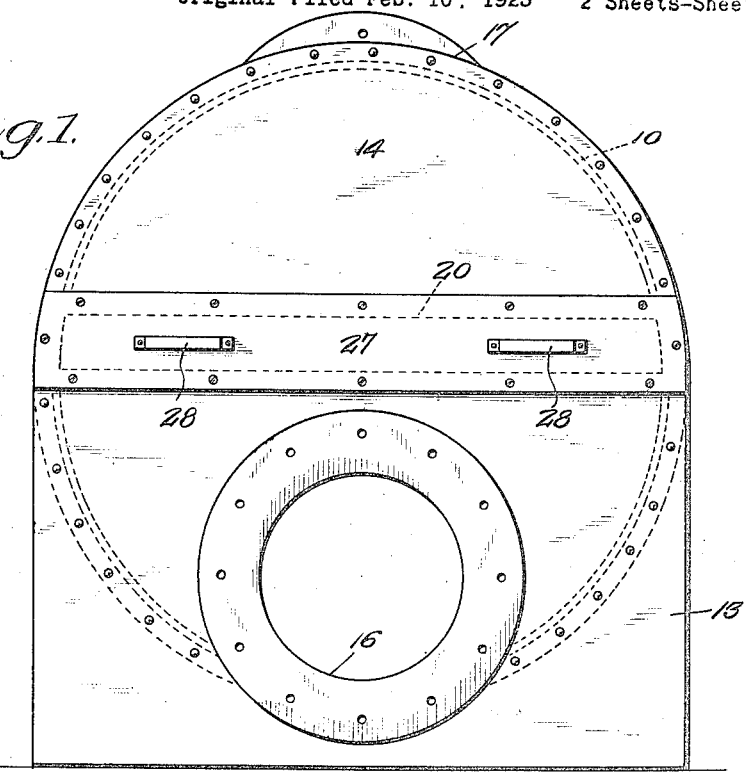
Fig. 1 represents a front elevation of an air filter embodying the invention.
Figure 2:
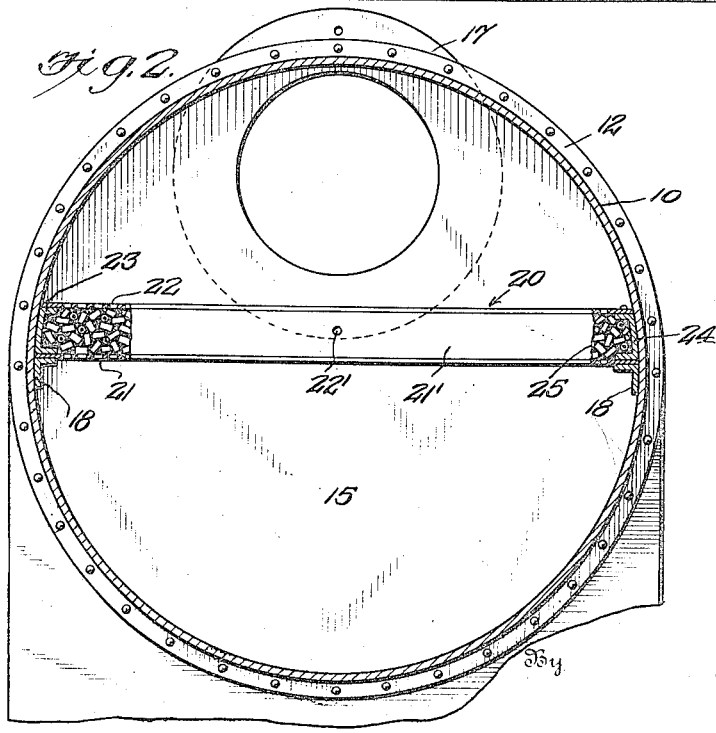
Fig. 2 represents a transverse section thereof, partly broken away, on line 2—2 of Fig. 3.
Figure 5:
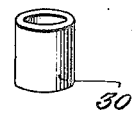
Fig. 5 represents in perspective a specimen of the elements comprising the filtering bed.

As illustrated in the drawings, the air filter includes an outer casing 10, of any suitable construction, preferably cylindrical in outline, and a series of filtering units 20 in the form of cells, preferably disposed at the largest portion of the casing, and provided with perforated bottoms 21 and tops 22 between which the filtering material 25 is contained.

The casing 10, which may be constructed of sheet metal, is provided at its front end with an out-turned flange 11 and at its rear end with an out-turned flange 12. The lower portion of the front end of the casing below the filter cells is closed by a rectangular plate 13, which extends below the casing and constitutes a leg or support therefor. The upper portion of the casing above the filter cells is closed by an arch-shaped plate 14. These plates 13 and 14 are riveted to the out-turned flange 11. The rear end of the casing is closed by a plate 15, which is squared at the bottom, and extends below the casing, forming a leg or support for the rear end thereof.

The front end of the casing is provided with a flanged intake pipe 16 preferably formed integral with the plate 13 and adapted to be connected with the supply of air to be filtered. This intake pipe has a large area and is disposed below the filter cells 20, its lower part being preferably adjacent to the bottom of the casing. The casing is provided at its rear end in its upper portion above the filter cells with a discharge pipe 17 also of large diameter, adapted to be connected with means for conveying filtered air to the compressor or other place of use.

The casing is provided along its opposite sides near its largest portion with flanged supports 18 on which the filter cells rest. In the construction shown three cells are indicated in Fig. 3, but a single drawer may be used if desired.

Each cell comprises a front plate 21' provided with a hole 22' or other means of engagement for a pull-out device. The sides 23 and 24 of the cells are preferably composed of channel irons. The bottom of the cells is in the form of a perforated plate 21.

Each cell has a top plate or cover 22 composed of perforated material. A closure plate 27 having a handle 28 is secured to and detachable from the front end of the cylinder opposite the cells, which are filled with filtering elements preferably in the form of small cylindrical sections 30 which are preferably coated with a suitable viscous material, to which the impurities of the air, passing through the filter cells readily adhere.

The air entering through the intake pipe 16 diffuses and spreads itself beneath the filtering units from the smaller lower portion of the casing to the larger diametrical portion and passes upward through the filtering units and through the chamber above them, outward through the discharge pipe 17.

This arrangement provides a slow horizontal diffusing current which is spread to a large area in its upward passage through the diametrical filter cells, so that a large filtering capacity is obtained in a compact space. In passing through the filtering material held between the perforated top and bottom of the horizontal cells, all dust and dirt contained in the air is deposited on the filtering material.

When the filtering material needs cleaning, the cover plate 26 is removed and the individual filter cells are taken out and subjected to a cleaning operation, and replaced.

In the construction shown herein the filtering beds are arranged horizontally, instead of in inclined positions. That is not an essential feature of the invention, however, and may be varied if desired; and while for most purposes I prefer to arrange the filter beds midway between the height of the casing that feature may likewise be varied without departing from the invention.

I claim as my invention:

1. In a device of the class described, the combination of a cylindrical casing having a horizontal axis, heads secured to the opposite ends of said casing and provided with supporting members, one of said heads being provided with an inlet aperture having its lowest portion substantially in alignment with the lowest portion of said casing, the other head being provided with a discharge aperture having its highest portion in substantial alignment with the highest portion of said casing, and a filtering member slidingly mounted within said casing along the axial line thereof, and removable from the interior of said casing through one of said heads.

2. In a device of the class described, the combination of a cylindrical casing having a horizontal axis and provided with end flanges, a head secured to said flange at one end of said casing and provided with an aperture at its upper end and with a supporting base at its lower end, another head having upper and lower sections secured to said flange, the lower section of said head being provided with an inlet aperture and a supporting base, and a filtering member slidingly mounted within said casing along the axial line thereof and removable therefrom between the upper and lower sections of said head.

3. In a device of the class described, the combination of a cylindrical casing having a horizontal axis, a head secured to one end of said casing and provided with a supporting base, a head secured to the opposite end of said casing and provided with an upper segmental section and with a lower section provided with an inlet aperture and a supporting base, and a filtering member slidingly mounted within said casing along the axial line thereof and provided at one end with a plate forming part of one head of said casing between said sections.

4. In a device of the class described, the combination of a cylindrical casing having a horizontal axis, heads closing opposite open ends of said cylindrical casing, one of said heads being provided with an aperture adjacent the lowest portion of said casing, the other head having an aperture adjacent the highest portion of said casing, and a filtering member mounted within said casing partitioning the casing between said apertures and dividing the casing into two semicylindrical chambers, one for each aperture.

In testimony that I claim the foregoing as my invention, I have signed my name hereunder.

ANDERS JORDAHL.